United States Patent [19]

Grosshandler

[11] Patent Number: 4,721,555
[45] Date of Patent: Jan. 26, 1988

[54] ELECTROLYSIS CELL SEAL MEANS

[75] Inventor: Sandor Grosshandler, Houston, Tex.

[73] Assignee: The Dow Chemical Company, Midland, Mich.

[21] Appl. No.: 761,923

[22] Filed: Aug. 2, 1985

[51] Int. Cl.⁴ .................. C25B 9/00; C25B 13/00
[52] U.S. Cl. .................... 204/252; 204/253; 204/279; 204/269
[58] Field of Search ......... 204/279, 253-258, 204/263-266, 269-270, 252; 429/35, 143, 185

[56] References Cited

U.S. PATENT DOCUMENTS

| 2,306,160 | 7/1939 | Freyssinet | 277/34.3 |
| 3,964,932 | 6/1976 | Oltman et al. | 429/185 |
| 4,026,782 | 5/1977 | Bouy et al. | 204/254 |
| 4,076,609 | 2/1978 | Max | 204/258 |
| 4,139,448 | 2/1979 | Wallace | 204/256 |
| 4,175,025 | 11/1979 | Creamer et al. | 204/279 X |
| 4,207,165 | 6/1980 | Mosé et al. | 204/279 X |
| 4,313,812 | 2/1982 | Kircher | 204/253 |
| 4,342,460 | 8/1982 | Eng | 204/279 X |
| 4,344,633 | 8/1982 | Niksa | 204/279 X |
| 4,431,502 | 2/1984 | Ford | 204/252 |
| 4,470,608 | 9/1984 | Warren | 277/164 |
| 4,493,759 | 1/1985 | Boulton et al. | 204/252 |

FOREIGN PATENT DOCUMENTS

5835272 8/1986 Japan .

Primary Examiner—Donald R. Valentine

[57] ABSTRACT

A seal means for an electrolysis cell including a substantially solid member adapted to be interposed between at least two electrode frame members of the cell. The substantially solid member has two parallel side walls, a generally planar top wall adapted for contacting a generally planar surface, and a bottom wall defined by an uneven surface adapted for contacting at least one electrode frame.

99 Claims, 18 Drawing Figures

ELECTROLYSIS CELL SEAL MEANS

BACKGROUND OF THE INVENTION

This invention relates to a seal means for electrolysis cells and a method of sealing electrolysis cells.

Electrolysis cells are used in various applications, for example, electrolyzing an alkali metal salt, such as sodium chloride, to produce a halide and alkali metal hydroxide, such as chlorine and sodium hydroxide. A typical structure for an electrolysis cell is that of the filter press-type, which includes monopolar or bipolar structures. Bipolar structures, for example, are as described in U.S. Pat. Nos. 4,108,742 and 4,111,779.

Typically, a seal means for an electrolysis cell, in particular a filter press-type cell, well known in the art, includes a gasket placed between two adjacent electrode frame members forming an electrolysis cell assembly. A compressive force is applied to the entire cell assembly to squeeze the elements together to form a fluid-tight, i.e., liquid- and gas-tight, seal. The compressive force typically is applied manually or may be applied utilizing hydraulic rams or other types of pressure-applying apparatus to compress the electrode frame members and gasket together. Upon compression, it is common for conventional gasket material, such as rubber or elastomer to deform and expand outwardly or "ooze-out" of the electrolysis cell assembly as pressure is applied to the frames via the frame members. Gaps between cell frame members, caused by gasket oozing out, may lead to gas or electrolyte leakage especially in pressurized cells, requiring shutdown of the cell's operation. Furthermore, in cells employing a separator or membrane, as the gaskets deform outwardly, certain separators which are in contact with the gaskets tend to stretch when they are pulled under the pressure of the outwardly deforming gaskets. The stretching of the separator by gasket deformation can cause the separator, which typically is a flat, thin, sheet-like membrane, to break or tear during compression of the gasket and frame members.

Any tears or breaks in the membrane employed in a cell may lead to reduced current efficiency during operation of the cell, greatly increasing electrical current usage while reducing the electrolytic operating efficiency of the cell. Too great a drop in current efficiency and/or electrolytic operating efficiency can require costly shutdown of the entire cell while the damaged membrane or membranes are replaced.

In order to achieve a fluid-tight cell, conventional seal means require a large amount of compressive force for adequate interface tightness between the cell frame members and membrane to prevent electrolyte leakage. This compressive force may become so large as to cause stretching of or damage to the thin and relatively weak membrane. Thus, mechanical failures of the membrane have been attributed to the mechanical inadequacies of the interface seal assemblies employed hitherto, and the service life expectancy of flat, sheet-like membranes for electrolysis cells have been known to be significantly effected by gasket characteristics and by the mechanics of sealing. It is desirous to elongate the service life of the membrane by providing a seal means which minimizes stretching of or damage to the membrane and thus, minimize production stoppages. Furthermore, elimination of gas and electrolyte leakage is desirous as such leakages may cause a safety hazard.

SUMMARY OF THE INVENTION

One aspect of the present invention is a seal means for an electrolysis cell comprising a substantially solid member adapted to be interposed between at least two adjacent electrode frames of the cell. The substantially solid member comprises parallel side walls, a generally planar top wall adapted for contacting a generally planar surface and a bottom wall defined by an uneven surface adapted for contacting at least one electrode frame of the cell.

Another aspect of the present invention is an electrolysis cell assembly including at least a first seal means interposed between at least two adjacent electrode frames, said first seal means comprising a substantially solid member having parallel side walls, a generally planar top wall contacting one electrode frame, and a bottom wall defined by an uneven surface contacting the electrode frame.

Still another aspect of the present invention is the electrolysis cell assembly above including a separator and a second seal means comprising a substantially solid member having parallel side walls, a generally planar top wall contacting one side of the separator and a bottom wall defined by an uneven surface contacting one electrode frame.

Yet another aspect of the present invention is a method of sealing an electrolysis cell employing the seal means above.

BRIEF DESCRIPTION OF THE DRAWINGS

The invention can be better understood by reference to the drawings illustrating the preferred embodiments of the invention. The same numerical designation is used in all the Figures where identical elements are shown.

DETAILED DESCRIPTION OF PREFERRED EMBODIMENT

Figure 1:
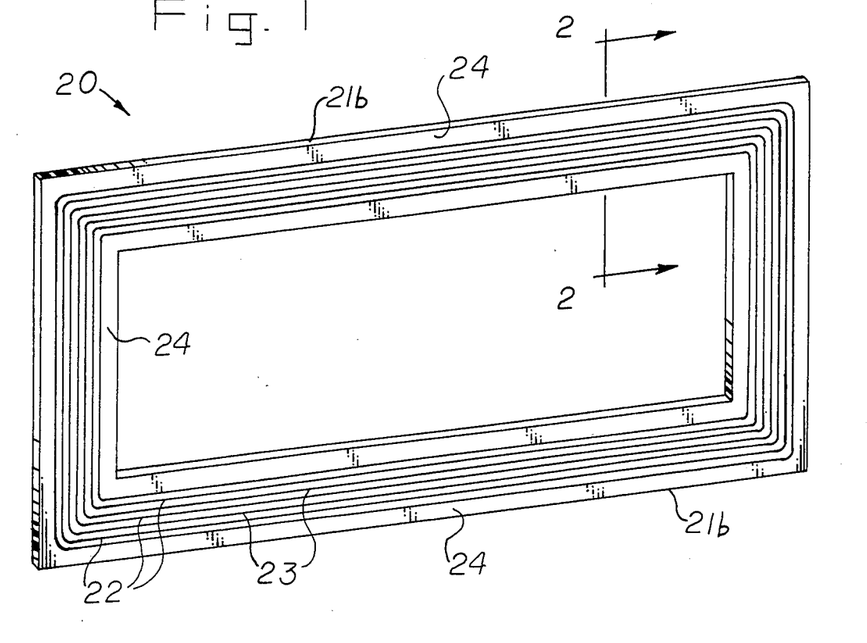
FIG. 1 is a perspective view of a frame-shaped seal means of the present invention.
Figure 2:
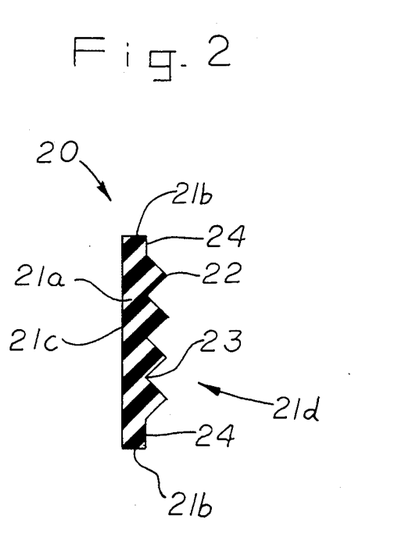
FIG. 2 is a cross-sectional view taken along line 2—2 of FIG. 1.
Figure 3:
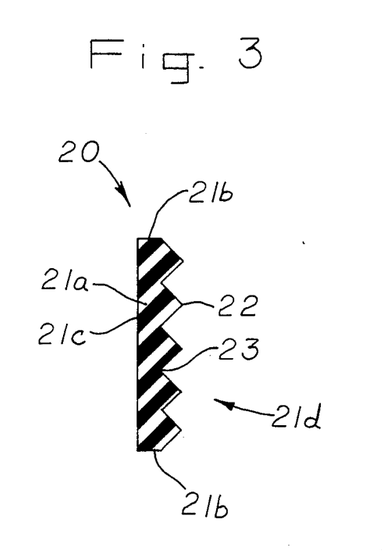
FIG. 3, is another embodiment of the seal means of the present invention showing a cross-sectional view of the seal means.
Figure 4:
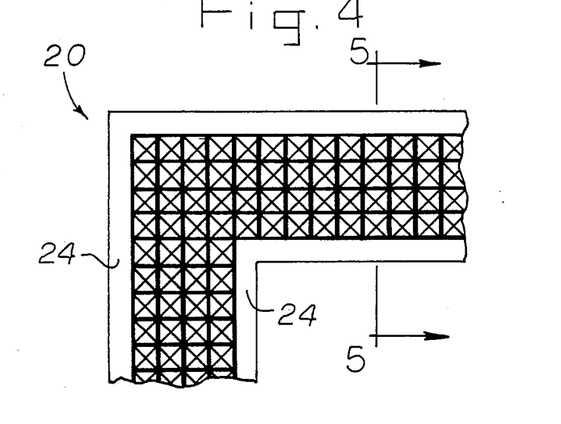
FIG. 4 is another embodiment of the seal means of the present invention showing a front view of a corner portion of the seal means.
Figure 5:
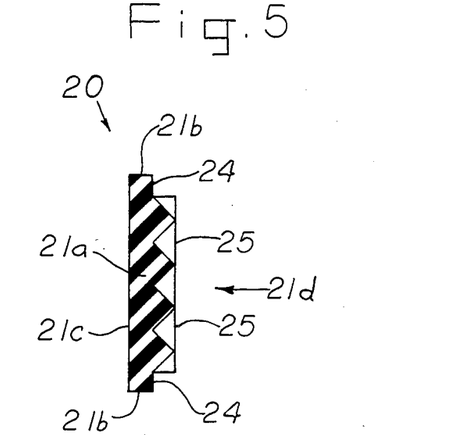
FIG. 5 is a cross-sectional view taken along line 5—5 of FIG. 4.
Figure 6:
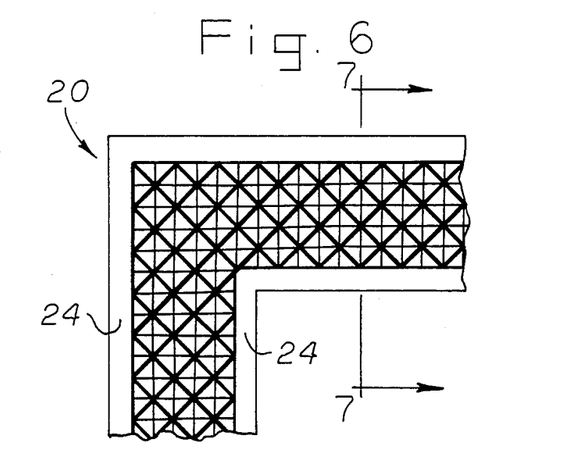
FIG. 6 is another embodiment of the seal means of the present invention showing a front view of a corner portion of the seal means.
Figure 7:
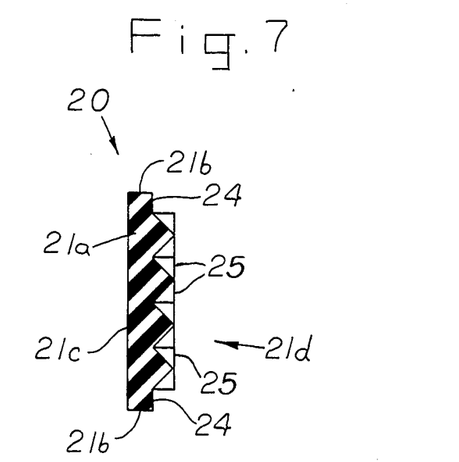
FIG. 7 is a cross-sectional view taken along line 7 of FIG. 6.
Figure 10:
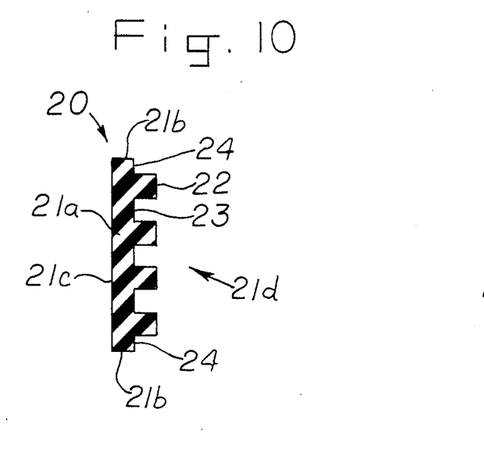
FIG. 10 is another embodiment of the seal means of the present invention showing a cross-sectional view of the seal means.
Figure 11:
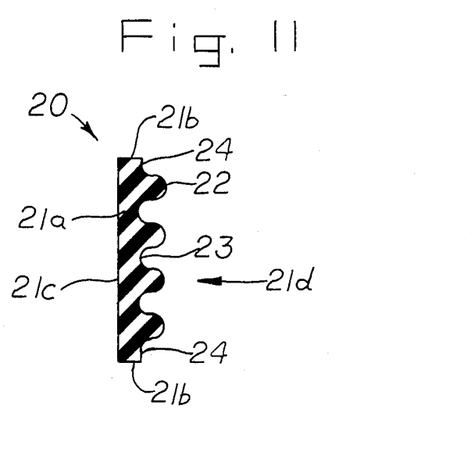
FIG. 11 is another embodiment of the seal means of the present invention showing a cross-sectional view of the seal means.

A frame-shaped seal means, generally referred to as numeral 20, is shown in FIGS. 1 and 2. Additional embodiments of seal means 20 are shown in FIGS. 3–14. The seal means 20, in this instance, is picture-framed and rectangular in shape, but is not to be limited thereto as other shapes such as square or circular may be used for the seal means 20. With reference to FIGS. 1 and 2, the seal means 20 as shown includes a substantially solid body 21a having side walls 21b which are preferably parallel, a generally planar top wall 21c, and a bottom wall generally referred to as 21d defined by a nonplanar or an uneven surface. "Substantially solid body" means the body may be porous or contain other materials embedded therein. The uneven surface, in this instance, may be in the form a series of ridges 22 and grooves 23 running parallel each other on the surface of the bottom wall 21d. In FIG. 1 there is shown the ridges 22 and grooves 23 rounded at the corners of the frame-shaped seal means 20, but this is not necessary for purposes of the invention. A cross-section view of the seal means 20, as shown in FIG. 2, shows the ridges 22 and groves 23 to be generally triangular in shape, although any cross-sectional shape may be used. For example, as shown in FIG. 10, the ridges 22 and grooves 23 may be of generally rectangular cross-section or, as shown in FIG. 11, the ridges 22 and grooves 23 may be of generally semi-circular cross-section. Furthermore, although not necessary for the purpose of the present invention, the seal means 20 may contain flat end portions 24, as shown in FIG. 2. FIG. 3 shows a seal means 20 without flat end portions 24.

Figure 8:
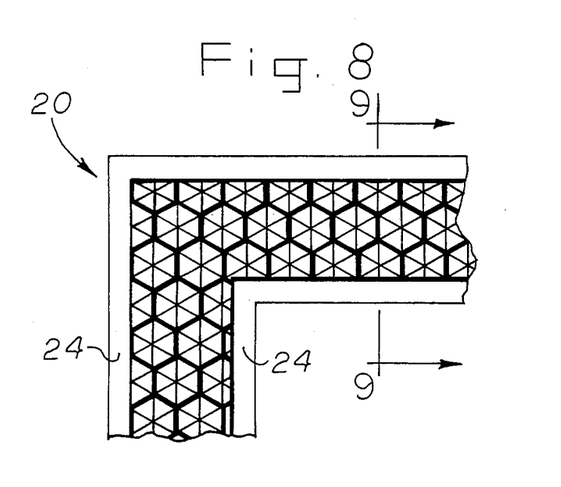
FIG. 8 is another embodiment of the seal means of the present invention showing a front view of a corner portion of the seal means.
Figure 9:
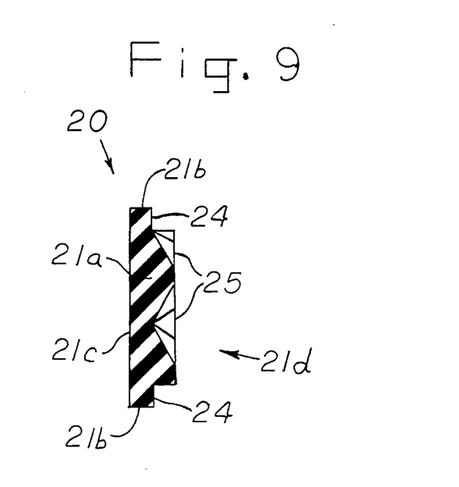
FIG. 9 is a cross-sectional view taken along line 9—9 of FIG. 8.

The uneven surface designated generally as the bottom wall 21d of the seal means 20 may be in the form of a plurality of concavities with ridge 25 as illustrated in FIGS. 4–9. Various shapes and sizes of the concavities are possible. However, it is preferred to use a uniform shape and size for the concavities. For example, the concavities may be pyramidal-shaped (FIG. 4), diamond-shaped (FIG. 6), or honeycomb-shaped (FIG. 8). The concavities provide ridges 25 adapted for contacting the gasket surface area of a cell frame member and providing an interface between the seal means and the gasket surface area of the cell frame member for sealing. In addition, the concavities advantageously provide non-interconnecting cup-like traps adapted for catching random gas or electrolyte leaks. In addition, the concavities provide a cup-like suction effect when compressed and are adapted for a gasket-to-frame attachment for vertically walled seal surfaces.

Seal means 20 may be gaskets of any material. For example, where the seal means is to be used as gaskets for chlor-alkali cells, e.g., in the electrolysis of aqueous alkali metal chloride solution, the gasket may be made of rubber or elastomer materials. Preferably, the gaskets are made of material which is physically and chemically stable, e.g., when contacted with an electrolyte and products of electrolysis present such as in a chlor-alkali cell. In the production of chlorine and caustic, for example, the gaskets must, of course, be substantially inert to acid, brine, chlorine, hydrogen and caustic. In addition, the gaskets are preferably electrically nonconductive. Furthermore, the gaskets should be of a material having high volume resistivity and good sealability after it has been compressed. Suitable materials which can be employed in accordance with this invention include, but are not limited to, for example, neoprene, butyl rubber, ethylene-propylene diene monomer (EPDM), chlorinated polyethylene (CPE) and a polytetrafluoroethylene (PTFE) material such as GORE-TEX ®, a trademark of W. L. Gore & Associates, Inc., or Teflon ®, a trademark of E. I. duPont de Nemours & Company. The durameter of these materials may range from about 50 to about 80 Shore A.

Figure 12:
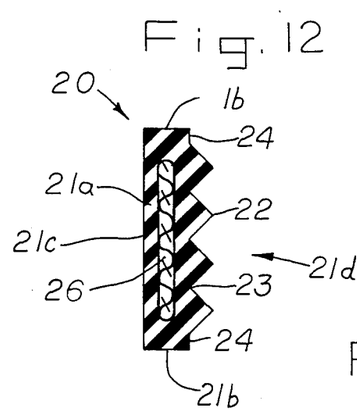
FIG. 12 is another embodiment of the seal means of the present invention showing a cross-sectional view of the seal means with rigidifying material embedded therein.

FIG. 12 shows another and preferred embodiment of the present invention wherein seal means 20 includes a reinforcement or rigidifying material 26 embedded in the solid body 21a. Although not shown, a rigidifying material may be used with any of the seal means 20 of the FIGS. 1–18, inclusive, if desired. The purpose of the rigidifying material is to minimize local compression and stiffen quadralaterally the seal means against stretch. The rigidifying material 26 may be made of any material inert to the gasket materials above, for example, an aromatic polyamide fiber, such as Kevlar ®, a trademark of E. I. duPont de Nemours & Company, polyester, nylon or fabric. The rigidifying material 26 may also be a screen of any metallic material. The rigidifying material 26, viewed in cross-section, may be any shape or form. Preferably, a fabric material is embedded within the solid body 21a. Any of the embodiments of seal means 20 of the present invention shown in any of the FIGS. 1–18, inclusive, may include the fabric material as the rigidifying material 26.

Figure 13:
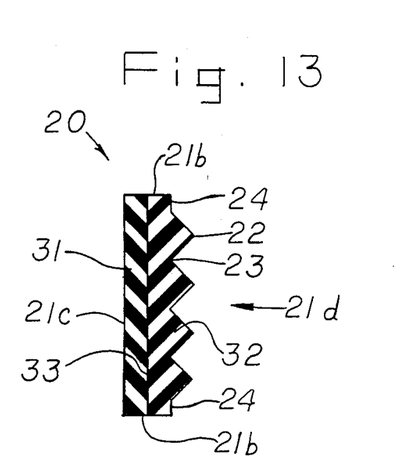
FIG. 13 is another embodiment of the seal means of the present invention showing a cross-sectional view of the seal means having a bi-layer construction.

Another embodiment of the present invention is shown in FIG. 13 wherein the seal means 20 is of a bi-layered construction comprising a first layer 31 and a second layer 32 attached to each other at interface 33 by well known methods such as adhesives. The materials of the first and second layers may be selected from the materials described above for seal means 20. The first and second layers 31 and 32, respectively, may be made identical or different materials with identical or different hardness. For example, the first layer 31 may be made of CPE with a hardness of 40 shore A and the second layer 32 may be made of EPDM with a hardness of 80 shore A.

Figure 14:
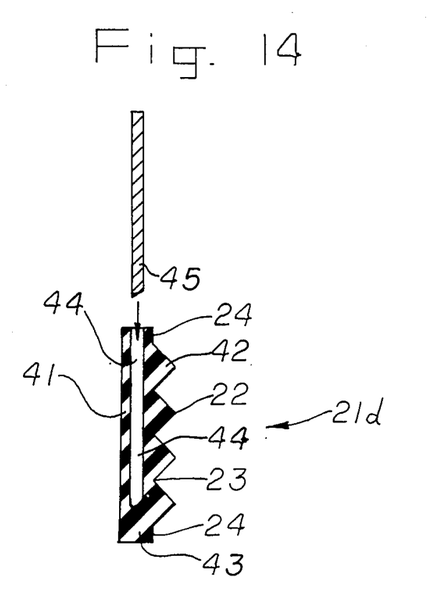
FIG. 14 is another embodiment of the seal means of the present invention showing a cross-sectional and exploded view of the seal means with a spacer member.

Yet another embodiment of the present invention is shown in FIG. 14. In FIG. 14 there is shown a seal means 20 with a back portion 41 and a front portion 42 connected at a bottom portion 43 forming a slot 44 in seal means 20 adapated to receive a spacer means 45. The first portion 42 may contain ridges 22 and grooves 23 of any shape in cross-section as described above. The back portion 41 may be thinner than the front portion 42. The spacer frame means 45 is positioned in slot 44. By shimming the spacer frame 45 into the slot 44, the seal means may be provided with further support to minimize excessive compression to the seal means due to nonparallelism or thickness variation of the frame assembly. The spacer means 45 is preferably wedge-shaped but may be of any desired shaped. The slot 44 may also be any shape to accommodated the spacer frame 45. The spacer frame 45 may be made of a polyvinylchloride polymer, Kynar®, and other thermoplastics that can provide the rigidity necessary to obtain a seal.

Figure 15:
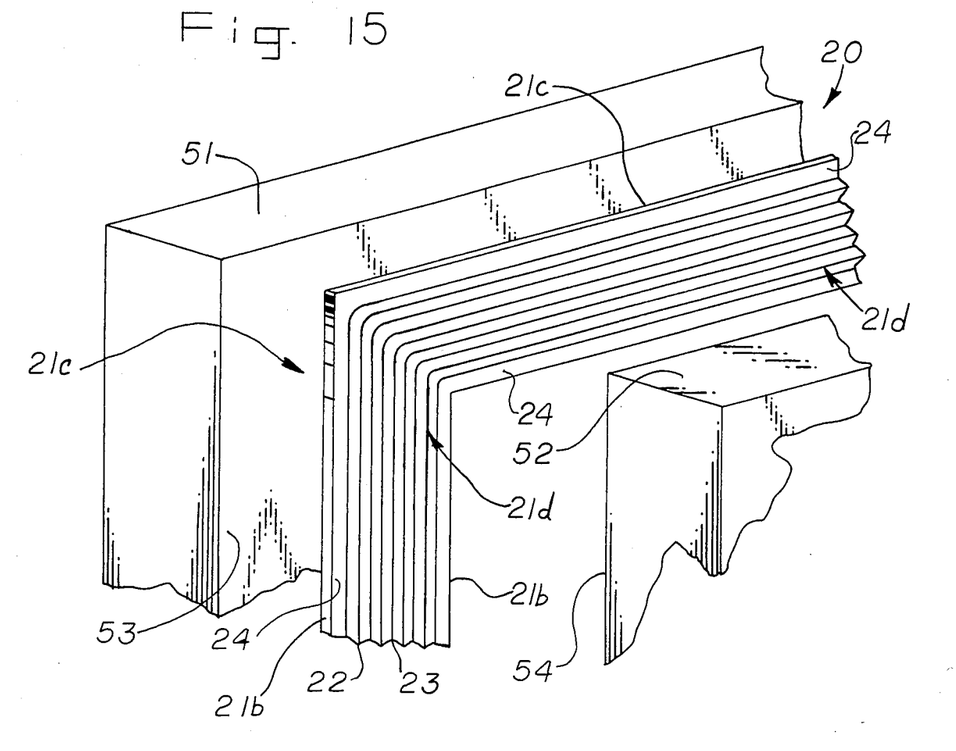
FIG. 15 is a perspective view of a corner portion of an electrolysis cell assembly showing adjacent filter press cell frames and an embodiment of the seal means of the present invention.
Figure 16:
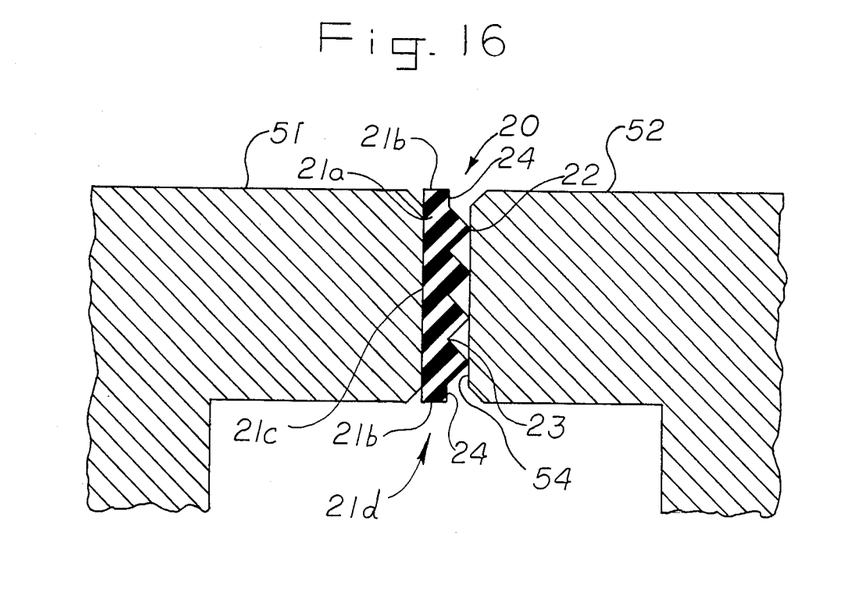
FIG. 16 is a cross-sectional view of a portion of an electrolysis cell assembly of FIG. 15.

As one preferred application, the seal means 20 may be used in electrolysis cells not employing a separator such as an electrolysis cell used for the production of a chlorate as illustrated in FIGS. 15 and 16, wherein the seal means 20 is interposed between two electrode frame members 51 and 52. In FIGS. 15 and 16, there is shown an electrolysis cell assembly including a seal means 20 interposed between a pair of adjacent filter press frames 51 and 52 without a separator. For illustrative purposes, frame 51 will be referred hereto as the anode frame 51 and frame 52 will be referred hereto as the cathode frame 52. Typically, the anode frame and cathode frame is a single frame structure wherein an anode and a cathode are attached on opposite faces or sides of the structure and electrically connected through the structure. In this instance, the electrolysis cell assembly is typical of a filter press-type electrolytic cell unit which may be monopolar or bipolar. For illustration only, the invention will be described herein with reference to a bipolar, electrolytic filter press-type cell. The seal means of the present invention is useful in filter press-type cells, for example, as described in U.S. Pat. Nos. 4,108,742 and 4,111,779.

In a more preferred application, the seal means of to the present invention may be used in an electrolysis cell with a separator, for example, chlor-alkali cells used for the production of chlorine and alkali metal hydroxide. Herein the present invention will be described with reference to an electrolytic chlor-alkali cell for the production of chlorine having a separator as shown in FIGS. 17 and 18.

Figure 17:
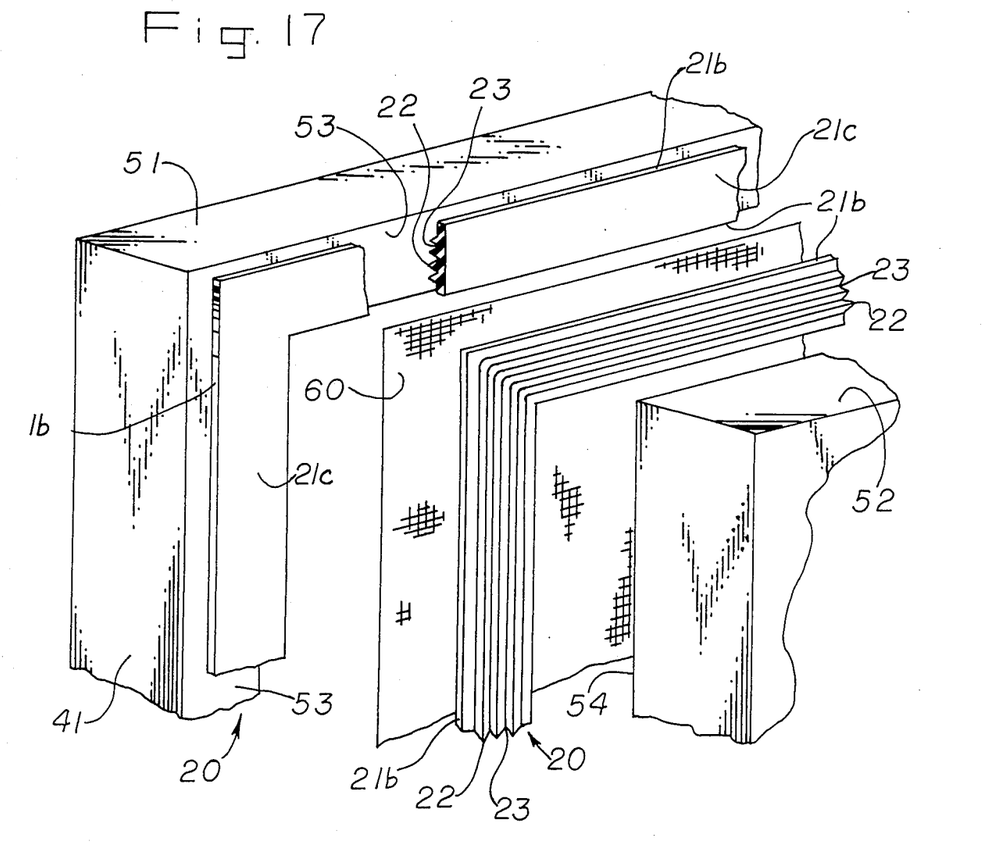
FIG. 17 is a perspective and partially cut-away view of a corner portion of an electrolysis cell assembly showing adjacent filter press cell frames, a membrane, and another embodiment of the seal means of the present invention.
Figure 18:
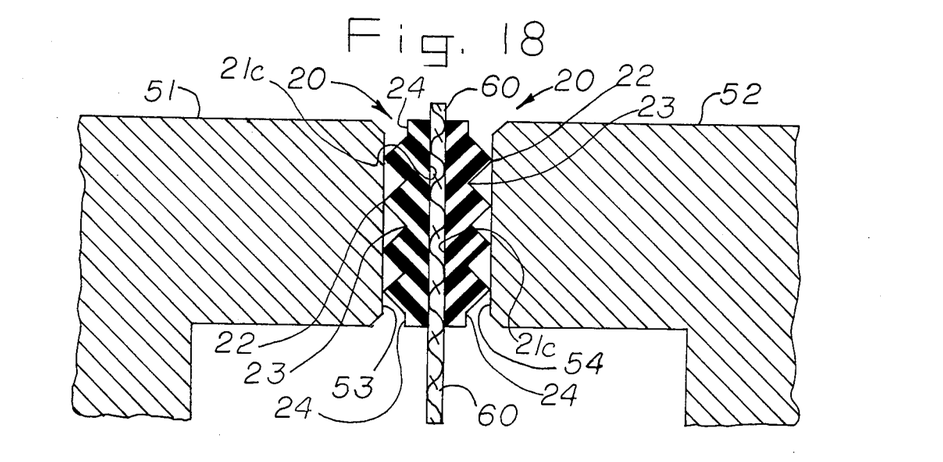
FIG. 18 is a cross-sectional view of a portion of the electrolysis cell assembly of FIG. 17.

Referring to FIGS. 17 and 18, a chlor-alkali cell assembly is shown including a separator 60 and two seal means 20 are positioned between frames 51 and 52. The separator 60 is interposed between the two seal means 20 while the two seal means 20 including the separator 60 are interposed between the lateral faces 53 and 54 of frames 51 and 52, respectively. The bottom wall 21d of the seal means is in contact with the lateral face 53 and 54 of electrode frames 51 and 52, respectively, and the top wall 21c of the seal means is in contact with the separator 60. The bottom walls 21d of each of the pair of seal means 20 essentially face opposite each other with the separator 60 interposed between the surface of the top wall 21c. Although two seal means 20 are illustrated in FIGS. 17 and 18, it is within the scope of the invention to use only one seal means between separator 60 and the frame 51 or 52, respectively, of the present invention.

Separator 60 used in the present invention may be any separator used in electrolysis cells heretofore such as diaphragms or membranes, but particularly useful in the present invention are ion-exchange membrane separators used in membrane filter press-type cells. Preferably, separators having ion-exchange properties and which are substantially impervious to the hydrodynamic flow of the electrolyte and the passage of gas products produced during electrolysis are used. Suitably used are cation-exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid group by processes such as hydrolysis. An example of a carboxylic acid type cation-exchange membrane is commercially available from Asahi Glass Company under the trademark Flemion®. Another example of a suitable membrane having cation-exchange properties is a perfluorosulfonic acid membrane solid commercially by E. I. duPont de Nemours and Company under the trademark Nafion®.

The materials of construction for frames 51 and 52 may be any which are resistant to corrosion by the electrolysis and the products of electrolysis. For example, metals such as iron, steel, stainless steel, nickel, titanium, or alloys of these metals may be used. Similarly, plastic materials such as polypropylene, polybutylene, polytetrafluoroethylene, fluorinated ethylene propylene (FEP) and chlorendic acid based polyesters can be employed. Liners of noncorrosive material may be used on lateral face 53 and 54 to protect frames 51 and 52, respectively, from contact with corrosive material. For example, a liner on cell frame 51 may be made of titanium metal to protect the frame structure from chlorine corrosion, e.g., in the electrolysis of an alkali metal chloride solution.

The frames 51 and 52 may be any shape used in typical electrolysis cells, for example, in the shape of rectangular bars, C or U channels, cylindrical tubes, elliptical tubes as well as being I-shaped or H-shaped. Preferably, the cross-section shape of the frame members are I-shaped.

In order to effectuate a fluid-tight seal between the adjacent frame members 51 and 52, a pair of seal means 20 is interposed between cell frames 51 and 52 so that the ridges 22 and grooves 23 bear against the lateral face 35 and 54 of frames 51 and 52, respectively, at the points of the ridges 22. The membrane 60 is interposed between the solid bodies 21a of the seal means 20 wherein the opposite sides of membrane 60 are in contact with the flat or planar surfaces 21c of solid bodies 21a. A compressive force, for example, using a hydraulic ram is applied to the cell frames to compress the seal means with the membrane together. FIG. 18 illustrates the cell assembly just prior to full compression on the frame members. Upon compression, the ridges 22 deform slightly which is not shown in FIG. 18. The nominal compressive stress normally used may range from about 50 pounds per square inch (psi) to about 2000 psi. Preferably, the nominal compressive stress on the seal means ranges from about 50 psi to about 600 psi and more preferably from about 50 psi to about 200 psi. However, the lowest stress required for effectuating a desired joint tightness is desirable for material endurance.

One advantage of the present seal means over conventional seal means is that an interfacial seal may be obtained at a lower nominal compressive stress with seal means having ridges and grooves than with seal means without ridges and grooves. Consequently, there is less compressive load on the membrane, and the intrinsic oozing of the gasketing material is significantly reduced. Since oozing is reduced, the tearing or breaking of a membrane is also reduced during compression of the seal means and membrane via the cell frame members which in turn enhances the expected service life of the membrane.

The following example is illustrative of the invention but the invention is not to be limited thereby.

GENERAL MEMBRANE TESTING PROCEDURE

A two foot by two foot test cell consisting of two cell frames provided with piping connections for air and hot water service is used to test the "sealability" of gaskets up to a cell pressure of 50 pounds per square inch (psig).

After cleaning the flanged surface of the cell frames, a gasket is cemented to the flange using a rubber cement. The membrane is then taped to one of the test cell frames. Care is taken to avoid wrinkles around the periphery of the membrane. The assembly is then placed in a hydraulic press testing machine and squeezed lightly to hold the assembly just enough to inspect for an even seating of the sealing surfaces.

The assembly is then squeezed to a gasket loading of approximately 50 psi and held for about 20 minutes. The loading is then relaxed to approximately 25 psi and held for about 10 minutes. The loading is then increased to approximately 75 psi. The cell is then filled with tap water and the water circulated therethrough. If wetting of the membrane or leakage of water is observed, the procedure is started over again. Upon an adequate seal around the entire periphery of the cell, the gasket loading is increased to approximately 110 psi in increments of 15 psi. Each increment is held for 20 minutes before raising the loading to the next increment. The gasket loading is then decreased to half of its high value. This process is known as "preconditioning" the gasketed assembly. The temperature of the circulating water is incrementally raised to 200° F. by increments of 20° F. per 30 minutes and the internal cell pressure (air-padding) is raised incrementally to 25 psig at 5 psi increments per 25 minutes.

In order to maintain the gasket loading ($S_g$) substantially constant, the ram force ($F_{ram}$) was set so as to satisfy the following equation:

$$S_g = \left(\frac{F_{ram}}{A_g}\right) - \left(\frac{A_c}{A_g}\right)(P)$$

where
 $S_g$=Apparent gasket stress (loading), psi;
 $F_{ram}$=Ram force, pounds (lb);
 $A_g$=Area of gasket, square inches (in$^2$);
 $A_c$=Area of cell, (in$^2$); and
 P=Cell pressure, psi;

After the above test conditions are reached, they are maintained for a minimum of 100 continuous hours. Air leakage is calculated by measuring the drop in air pressure during several half-hour intervals; while the temperature remains substantially constant. Thus, a prorated air loss per day can be calculated using the well known ideal gas formula:

PV=nRT where
 P=pressure (PSFA)
 V=value (FT$^3$)
 n=moles (lbs)
 R=universal gas constant (53.3 for air) and
 T=temperature Upon completion of the test, the cell assembly is disassembled. The gasket is examined for permanent deformation and the membrane is examined for thinning and/or tears.

EXAMPLE 1

The general procedure above was followed to test a pair of gaskets having a plurality of ridges and grooves of triangular shape in cross-section, herein serrated gaskets, shown in FIGS. 11 and 12. The serrated gaskets were made of EDPM rubber obtained from Sealmaster Corporation, Kent, Ohio. The size of the serrated gaskets were 25 inches by 25 inches by ⅛ inch. The membrane tested was Nafion®321. The cell frame was maintained at 30 psig and the water circulated was maintained at 200° F. for 140 hours. The gasket loading was about 70 psi. Visual observation of the serrated gaskets and membrane after the testing period showed some pressure marks with an acceptable amount of stretching, but the membrane showed no sign of tearing or breaking.

What is claimed is:

1. A seal means for an electrolysis cell comprising a substantially solid member with a rigidifying material embedded therein and adapted to be interposed between at least two adjacent electrode frames of the cell, said substantially solid member comprising parallel side walls, a generally planar top wall adapted for contacting a generally planar surface and a bottom wall defined by an uneven surface adapted for contacting at least one electrode frame.

2. The seal means of claim 1 wherein the rigidifying material is a plastic, metal or fabric material.

3. The seal means of claim 2 wherein the seal means is made of ethylene propylene.

4. The seal means of claim 2 wherein the seal means is made of chlorinated polyethylene.

5. An electrolysis cell assembly comprising at least a first seal means interposed between at least two adjacent electrode frames, said first seal means comprising a substantially solid member having parallel side walls, a generally planar top wall contacting one electrode frame, and a bottom wall defined by an uneven surface contacting the other electrode frame.

6. The cell assembly of claim 5 including a separator with a first and second side interposed between the first seal means and a first electrode frame wherein the top wall of the first seal means is in contact with the first side of the separator and the bottom wall of the first seal means is in contact with a second electrode frame.

7. The cell assembly of claim 6 including a second seal means interposed between the separator and the first electrode frame, said second seal means comprising a substantially solid member having parallel side walls, a generally planar top wall contacting the second side of the separator, and a bottom wall defined by an uneven surface contacting the first electrode frame.

8. The cell assembly of claim 7 wherein the separator is a membrane.

9. An electrolysis cell assembly comprising at least a first seal means including a rigidifying material embedded therein interposed between at least two adjacent electrode frames, said first seal means comprising a substantially solid member having parallel side walls, a generally planar top wall contacting one electrode frame, and a bottom wall defined by an uneven surface contacting the other electrode frame.

10. The cell assembly of claim 9 wherein the rigidifying material is a plastic, metal or fabric.

11. The cell assembly of claim 10 wherein the seal means is made of ethylene propylene diene.

12. The cell assembly of claim 10 wherein the seal means is made of chlorinated polyethylene.

13. An electrolysis cell assembly of the filter press-type comprising
   (a) an anode frame,
   (b) a cathode frame,
   (c) a separator interposed between the anode and cathode frame,
   (d) a first seal means including a rigidifying material embedded therein interposed between the anode frame and the separator, said first seal means comprising a substantially solid member having parallel side walls, a generally planar top wall contacting one side of the separator and a bottom wall defined by an uneven surface contacting a generally planar side of the cathode frame, and
   (e) a second seal means interposed between the cathode frame and the separator, said second seal means comprising a substantially solid member having parallel side walls, a generally planar top wall contacting the other side of the separator and a bottom wall defined by a series of ridges contacting a generally planar side of the cathode frame.

14. The cell assembly of claim 13 wherein the rigidifying material is plastic, metal or fabric.

15. The cell assembly of claim 13 wherein the seal means is made of ethylene propylene diene.

16. The cell assembly of claim 14 wherein the seal means is made of chlorinated polyethylene.

17. A method of sealing an electrolysis cell comprising interposing at least a first seal means between at least two adjacent electrode frames of the cell and applying a compressive force to the frames, said first seal means comprising a substantially solid member having parallel side walls, a generally planar top wall contacting one electrode frame and a bottom wall defined by an uneven surface contacting the other electrode frame.

18. The method of claim 16 including interposing a separator with a first and second side between the first seal means and a first electrode frame wherein the top wall of the first seal means is in contact with the first side of the separator and the bottom wall of the first seal means is in contact with a second electrode frame.

19. The method of claim 17 including interposing a second seal means between the separator and the first electrode frame, said second seal means comprising a substantially solid member having parallel side walls, a generally planar top wall contacting the second side of the separator and a bottom wall defined by an uneven surface contacting the first electrode frame.

20. The method of claim 19 wherein the separator is a membrane.

21. A method of sealing an electrolysis cell comprising interposing at least a first seal means including a rigidifying material embedded therein between at least two adjacent electrode frames of the cell and applying a compressive force to the frames, said first seal means comprising a substantially solid member having parallel side walls, a generally planar top wall contacting one electrode frame, and a bottom wall defined by an uneven surface contacting the other electrode frame.

22. The method of claim 21 wherein the rigidifying material is a plastic, metal or fabric material.

23. The method of claim 22 wherein the seal means is made of ethylene propylene diene.

24. The method of claim 22 wherein the seal means is made of chlorinated polyethylene.

25. A gasket for an electrolysis cell comprising a substantially solid member adapted to be interposed between at least two adjacent electrode frames of the cell, said substantially solid member comprising parallel side walls, a generally planar top wall adapted for contacting a generally planar surface and a bottom wall defined by a series of ridges.

26. The gasket of claim 25 wherein the ridges are of generally triangular, rectangular or semi-circular cross-section.

27. The gasket of claim 25 wherein the seal means is made of ethylene propylene diene.

28. The gasket of claim 25 wherein the seal means is made of chlorinated polyethylene.

29. The gasket of claim 25 wherein the substantially solid member is porous.

30. The gasket of claim 25 wherein the substantially solid member includes a rigidifying material embedded therein.

31. The gasket of claim 30 wherein the rigidifying material is a plastic, metal or fabric material.

32. A gasket for an electrolysis cell comprising a substantially solid member adapted to be interposed between at least two adjacent electrode frames of the cell, said substantially solid member comprising parallel side walls, a generally planar top wall adapted for contacting a generally planar surface and a bottom wall defined by a plurality of concavities.

33. The gasket of claim 31 wherein the concavities are pyramidal-, diamond-, or honeycomb-shaped.

34. The gasket of claim 33 wherein the seal means is made of ethylene propylene diene.

35. The gasket of claim 33 wherein the seal means is made of chlorinated polyethylene.

36. The gasket of claim 33 wherein the substantially solid member is porous.

37. The gasket of claim 33 wherein the substantially solid member includes a rigidifying material embedded therein.

38. The gasket of claim 36 wherein the rigidifying material is a plastic, metal or fabric material.

39. An electrolysis cell assembly comprising at least a first seal means interposed between at least two adjacent electrode frames, said first seal means comprising a substantially solid member having parallel side walls, a generally planar top wall contacting one electrode frame, and a bottom wall defined by a series ridges contacting the other electrode frame.

40. The cell assembly of claim 39 including a separator with a first and second side interposed between the first seal means and a first electrode frame wherein the top wall of the first seal means is in contact with the first side of the separator and the bottom wall of the first seal means is in contact with a second electrode frame.

41. The cell assembly of claim 40 including a second seal means interposed between the separator and the first electrode frame, said second seal means comprising a substantially solid member having parallel side walls, a generally planar top wall contacting the second side of the separator and a bottom wall defined by a series of ridges contacting the first electrode frame.

42. The cell assembly of claim 41 wherein the separator is a membrane.

43. The cell assembly of claim 39 wherein the ridges are of generally triangular, rectangular or semi-circular cross-section.

44. The cell assembly of claim 39 wherein the seal means is a gasket.

45. The cell assembly of claim 39 wherein the seal means is made of ethylene propylene diene.

46. The cell assembly of claim 39 wherein the seal means is made of chlorinated polyethylene.

47. The cell assembly of claim 39 wherein the substantially solid member is porous.

48. The cell assembly of claim 39 wherein the substantially solid member includes a rigidifying material embedded therein.

49. The cell assembly of claim 48 wherein the rigidifying material is a plastic, metal or fabric material.

50. An electrolysis cell assembly comprising at least a first seal means interposed between at least two adjacent electrode frames, said first seal means comprising a substantially solid member having parallel side walls, a generally planar top wall contacting one electrode frame, and a bottom wall defined by a plurality of concavities contacting the other electrode frame.

51. The cell assembly of claim 50 including a separator with a first and second side interposed between the first seal means and a first electrode frame wherein the top wall of the first seal means is in contact with the first side of the separator and the bottom wall of the first seal means is in contact with a second electrode frame.

52. The cell assembly of claim 51 including a second seal means interposed between the separator and the first electrode frame, said second seal means comprising a substantially solid member having parallel side walls, a generally planar top wall contacting the second side of the separator and a bottom wall defined by a plurality of concavities contacting the first electrode frame.

53. The cell assembly of claim 52 wherein the separator is a membrane.

54. The cell assembly of claim 50 wherein the concavities are pyramidal-, diamond- or honeycomb-shaped.

55. The cell assembly of claim 50 wherein the seal means is a gasket.

56. The cell assembly of claim 50 wherein the seal means is made of ethylene propylene diene.

57. The cell assembly of claim 50 wherein the seal means is made of chlorinated polyethylene.

58. The cell assembly of claim 50 wherein the substantially solid member is porous.

59. The cell assembly of claim 50 wherein the substantially solid member includes a rigidifying material embedded therein.

60. The cell assembly of claim 59 wherein the rigidifying material is a plastic, metal or fabric.

61. An electrolysis cell assembly of the filter press-type comprising
 (a) an anode frame,
 (b) a cathode frame,
 (c) a separator interposed between the anode and cathode frame,
 (d) a first seal means interposed between the anode frame and the separator, said first seal means comprising a substantially solid member having parallel side walls, a generally planar top wall contacting one side of the separator and a bottom wall defined by a series of ridges contacting a generally planar side of the cathode frame, and
 (e) a second seal means interposed between the cathode frame and the separator, said second seal means comprising a substantially solid member having parallel side walls, a generally planar top wall contacting the other side of the separator and a bottom wall defined by a series of ridges contacting a generally planar side of the cathode frame.

62. The cell assembly of claim 61 wherein the separator is a membrane.

63. The cell assembly of claim 61 wherein the ridges are of generally triangular, rectangular or semi-circular cross-section.

64. The cell assembly of claim 61 wherein the seal means is a gasket.

65. The cell assembly of claim 61 wherein the seal means is made of ethylene propylene diene.

66. The cell assembly of claim 61 wherein the seal means is made of chlorinated polyethylene.

67. The cell assembly of claim 61 wherein the substantially solid member is porous.

68. The cell assembly of claim 61 wherein the substantially solid member includes a rigidifying material embedded therein.

69. The cell assembly of claim 68 wherein the rigidifying material is a plastic, metal or fabric.

70. An electrolysis cell assembly of the filter press-type comprising
 (a) an anode frame,
 (b) a cathode frame,
 (c) a separator interposed between the anode and cathode frame,
 (d) a first seal means interposed between the anode frame and the separator, said first seal means comprising a substantially solid member having parallel side walls, a generally planar top wall contacting one side of the separator and a bottom wall defined by a plurality of concavities contacting a generally planar side of the cathode frame, and
 (e) a second seal means interposed between the cathod frame and the separator, said second seal means comprising a substantially solid member having parallel side walls, a generally planar top wall contacting the other side of the separator and a bottom wall defined by a plurality of concavities contacting a generally planar side of the cathode frame.

71. The cell assembly of claim 70 wherein the separator is a membrane.

72. The cell assembly of claim 70 wherein the concavities are pyramidal-, diamond- or honeycomb-shaped.

73. The cell assembly of claim 70 wherein the seal means is a gasket.

74. The cell assembly of claim 70 wherein the seal means is made of ethylene propylene diene.

75. The cell assembly of claim 70 wherein the seal means is made of chlorinated polyethylene.

76. The cell assembly of claim 70 wherein the substantially solid member is porous.

77. The cell assembly of claim 70 wherein the substantially solid member includes a rigidifying material embedded therein.

78. The cell assembly of claim 77 wherein the rigidifying material is a plastic, metal or fabric.

79. A method of sealing an electrolysis cell comprising interposing at least a first seal means between at least two adjacent electrode frames of the cell and applying a compressive force to the frames, said first seal means comprising a substantially solid member having parallel side walls, a generally planar top wall contacting one electrode frame, and a bottom wall defined by a series ridges contacting the other electrode frame.

80. The method of claim 79 including interposing a separator with a first and second side between the first seal means and a first electrode frame wherein the top wall of the first seal means is in contact with the first side of the separator and the bottom wall of the first seal means is in contact with a second electrode frame.

81. The method of claim 80 including interposing a second seal means between the separator and the first electrode frame, said second seal means comprising a substantially solid member having parallel side walls, a generally planar top wall contacting the second side of the separator and a bottom wall defined by a series of ridges contacting the first electrode frame.

82. The method of claim 81 wherein the separator is a membrane.

83. The method of claim 81 wherein the ridges are of generally triangular, rectangular or semi-circular cross-section.

84. The method of claim 81 wherein the seal means is a gasket.

85. The method of claim 81 wherein the seal means is made of ethylene propylene diene.

86. The method of claim 81 wherein the seal means is made of chlorinated polyethylene.

87. The method of claim 81 wherein the substantially solid member is porous.

88. The method of claim 81 wherein the substantially solid member includes a rigidifying material embedded therein.

89. The method of claim 88 wherein the rigidifying material is a plastic, metal or fabric.

90. A method of sealing an electrolysis cell comprising interposing at least a first seal means between at least two adjacent electrode frames of the cell and applying a compressive force to the frames, said first seal means comprising a substantially solid member having parallel side walls, a generally planar top wall contacting one electrode frame, and a bottom wall defined by a plurality of concavities contacting the other electrode frame.

91. The method of claim 90 including interposing a separator with a first and second side between the first seal means and a first electrode frame wherein the top wall of the first seal means is in contact with the first side of the separator and the bottom wall of the first seal means is in contact with a second electrode frame.

92. The method of claim 91 including interposing a second seal means between the separator and the first electrode frame, said second seal means comprising a substantially solid member having parallel side walls, a generally planar top wall contacting the second side of the separator and a bottom wall defined by a plurality of concavities contacting the first electrode frame.

93. The method of claim 92 wherein the separator is a membrane.

94. The method of claim 92 wherein the concavities are pyramidal-, diamond- or honeycomb-shaped.

95. The method of claim 92 wherein the seal means is a gasket.

96. The method of claim 92 wherein the seal means is made of ethylene propylene diene.

97. The method of claim 92 wherein the seal means is made of chlorinated polyethylene.

98. The method of claim 92 wherein the seal means includes a rigidifying material embedded therein.

99. The method of claim 98 wherein the rigidifying material is a plastic, metal or fabric.

* * * * *